Sept. 24, 1946. C. L. CUMMINS 2,408,298
FUEL FEEDING AND INJECTION APPARATUS FOR OIL BURNING ENGINES
Filed April 26, 1943 9 Sheets-Sheet 7
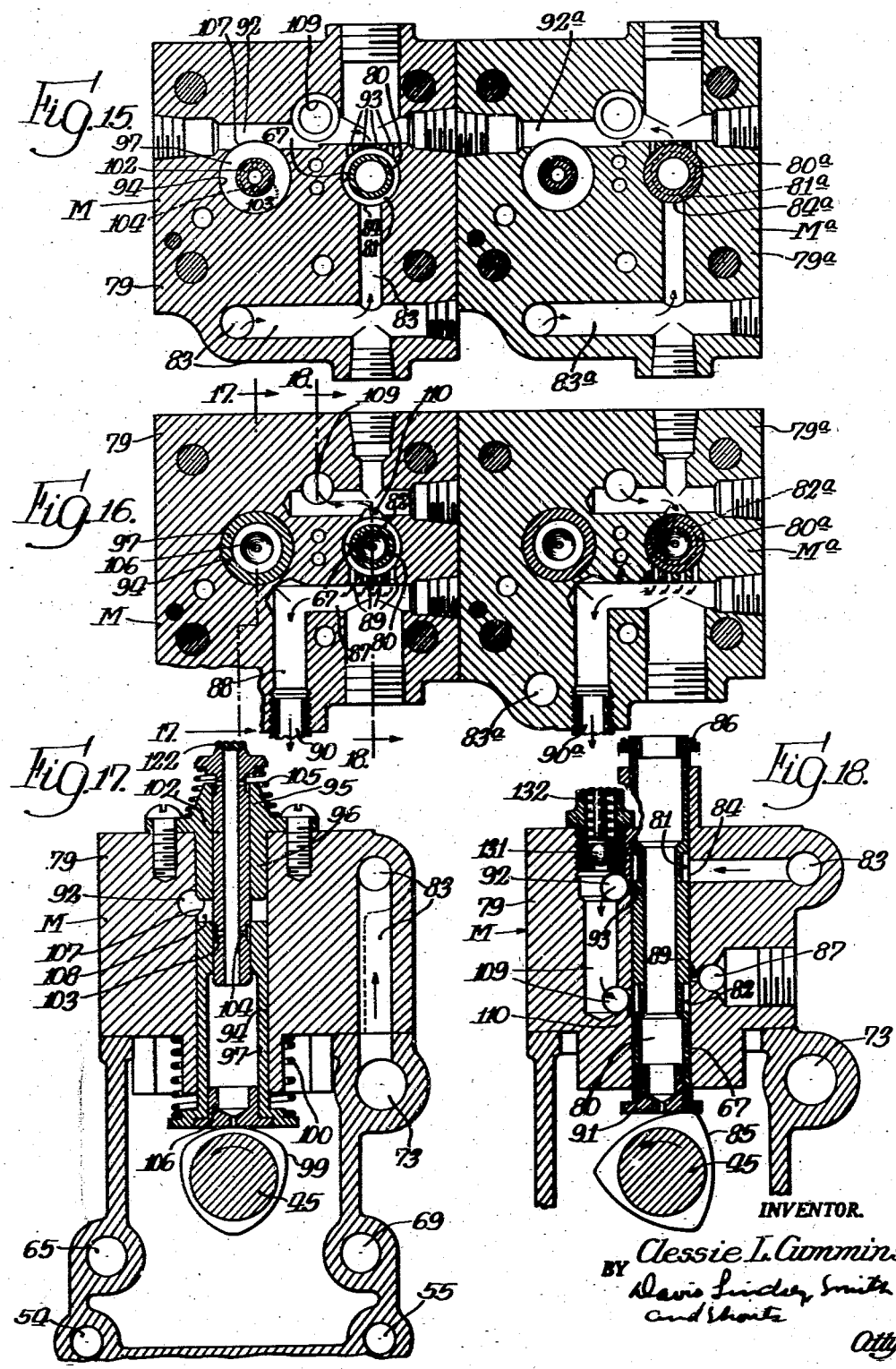
INVENTOR.
BY Clessie L. Cummins.
Davis Lindsey Smith
and Shortz
Attys.

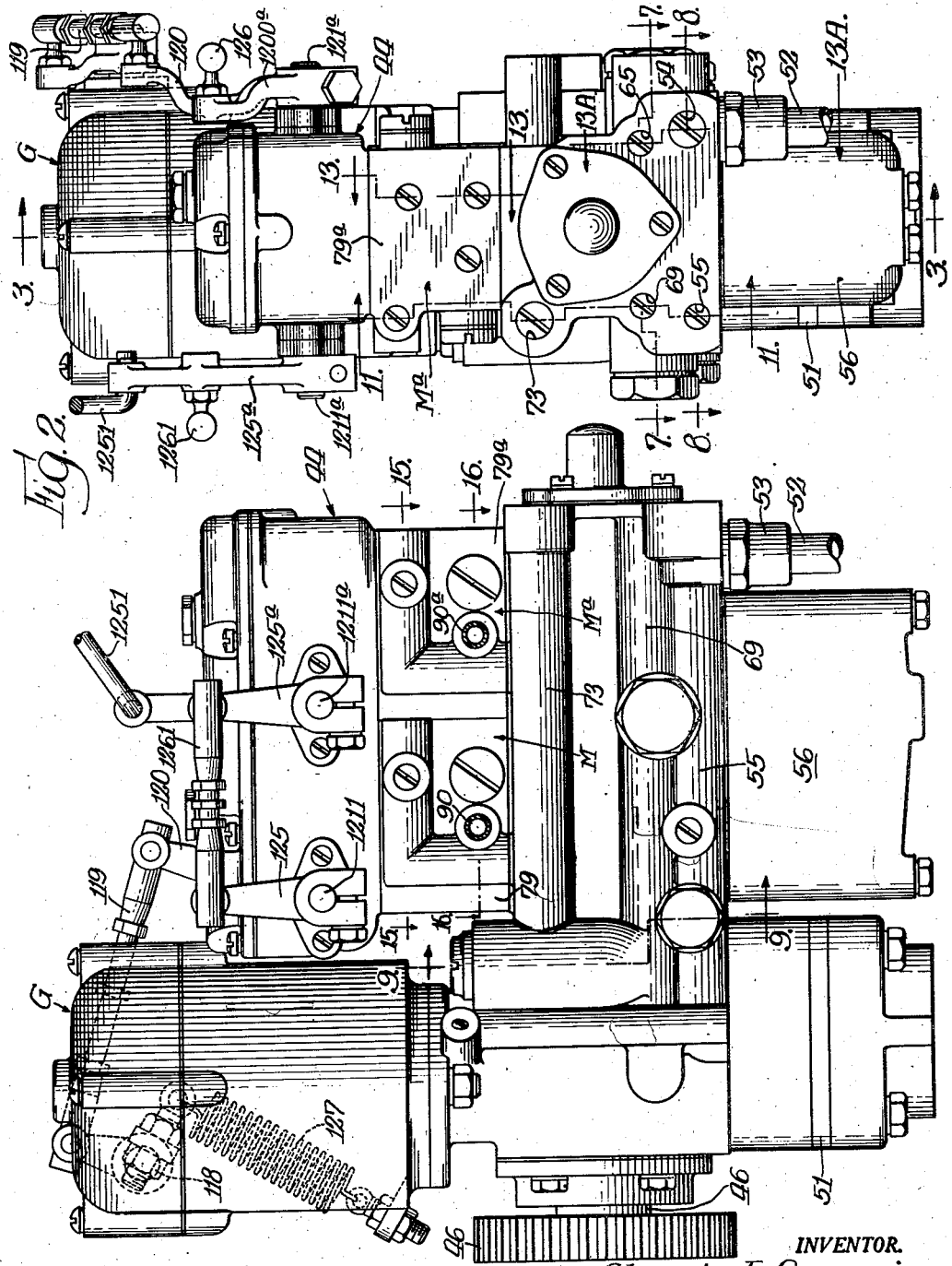

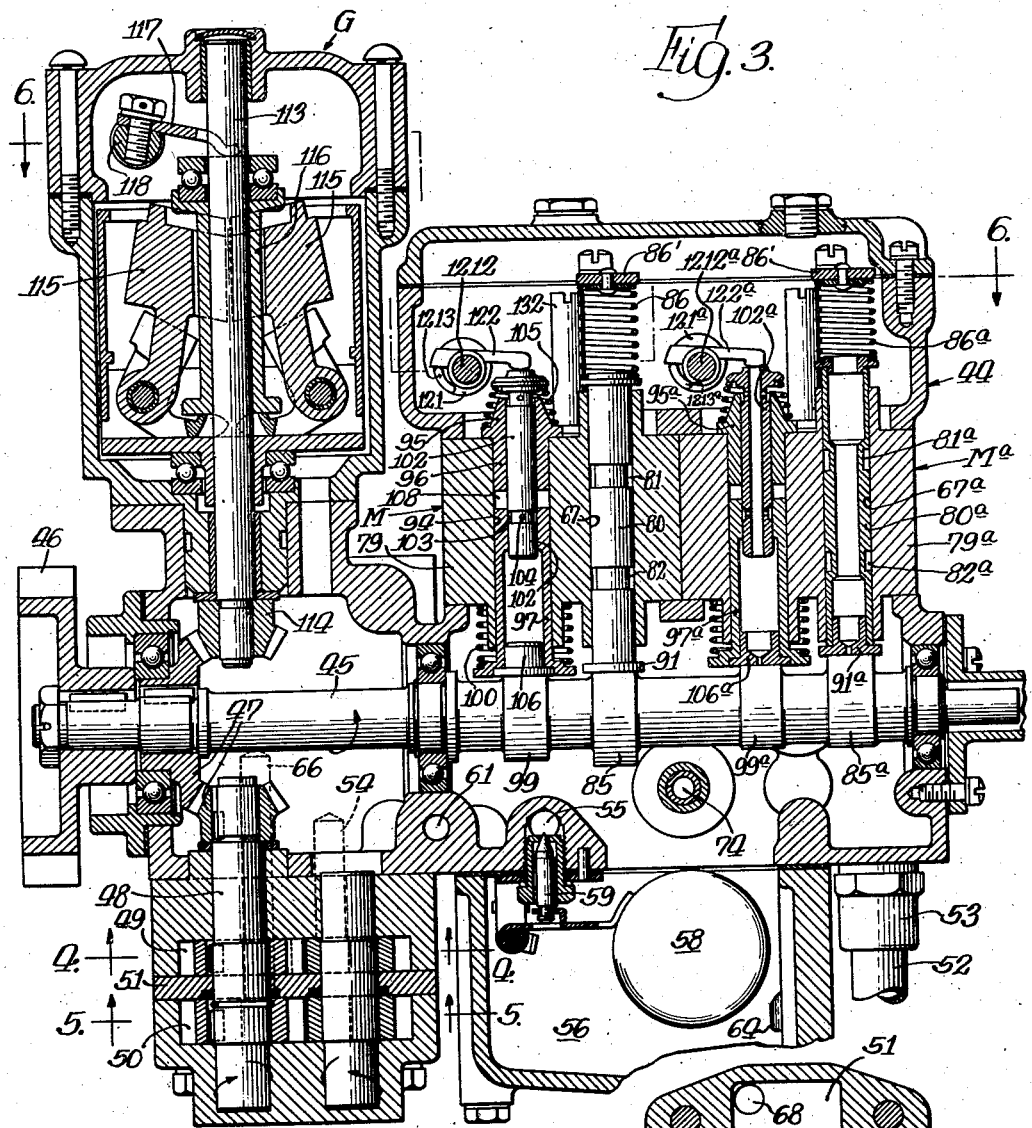

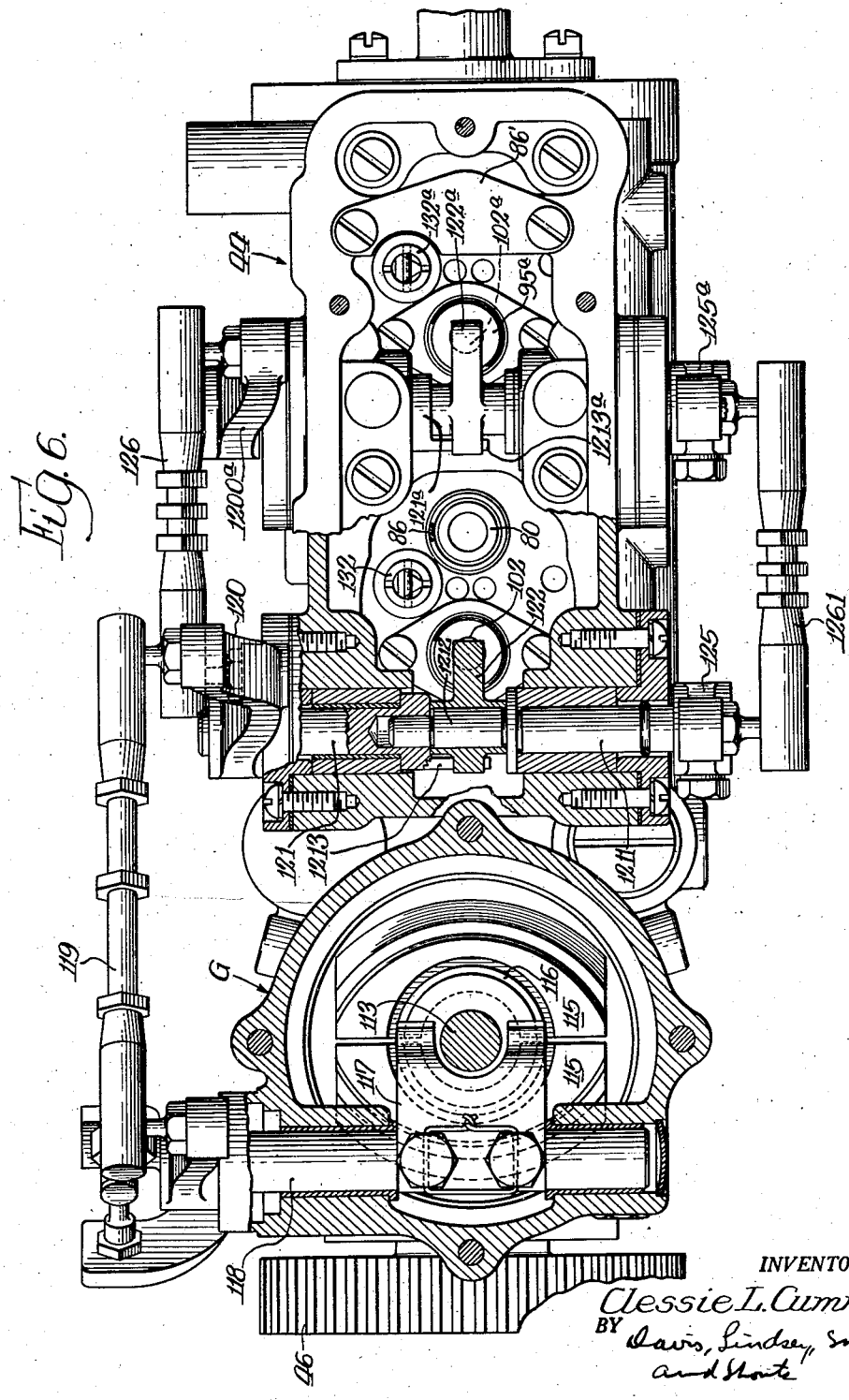

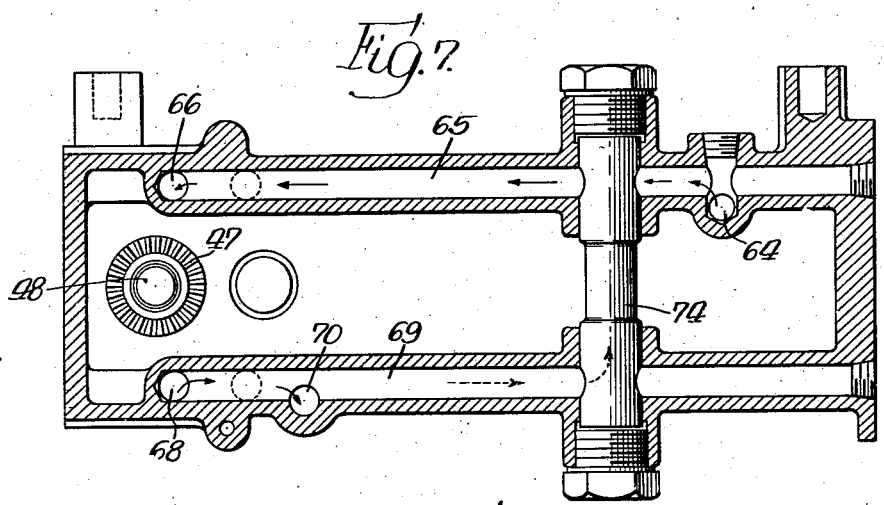

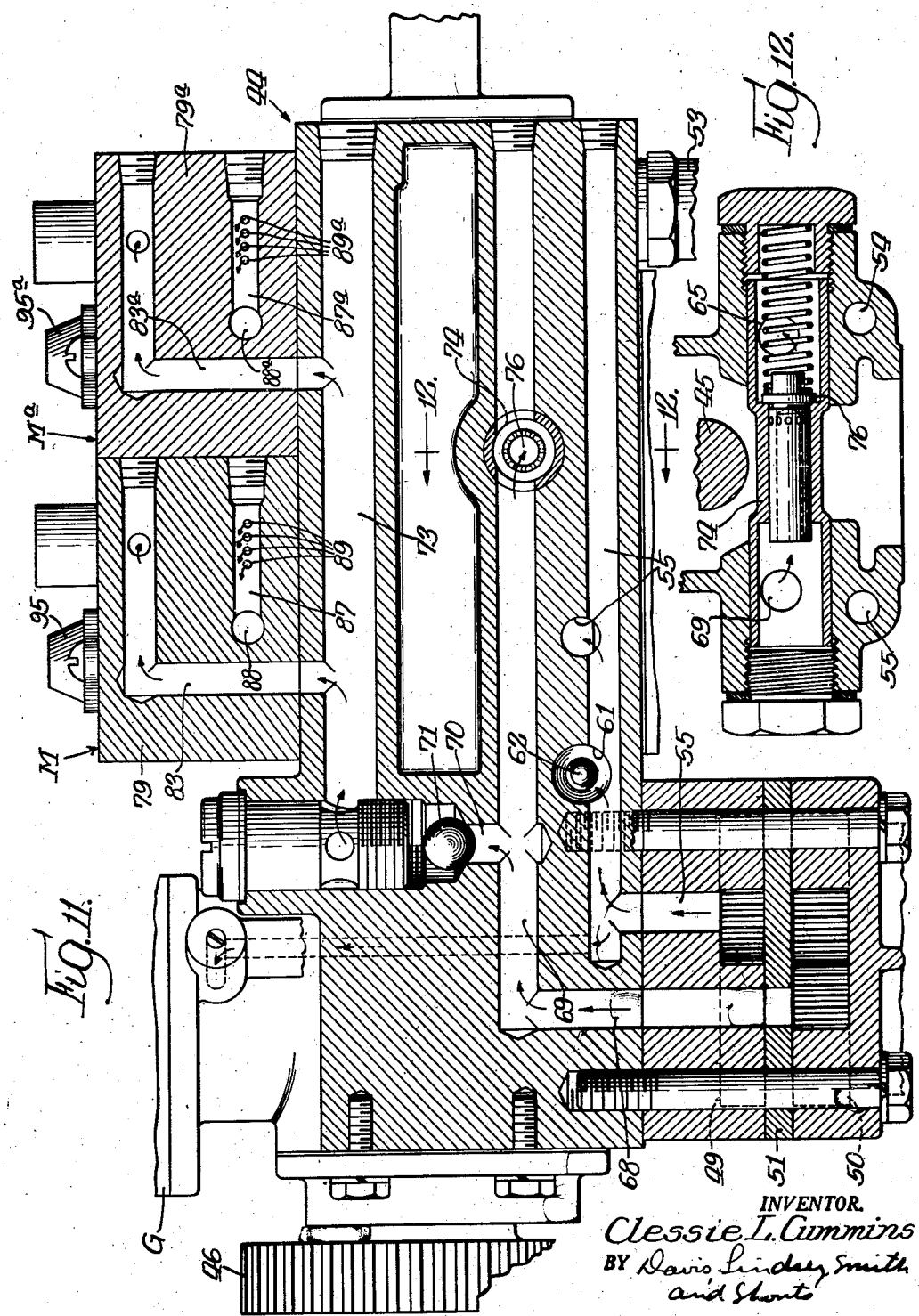

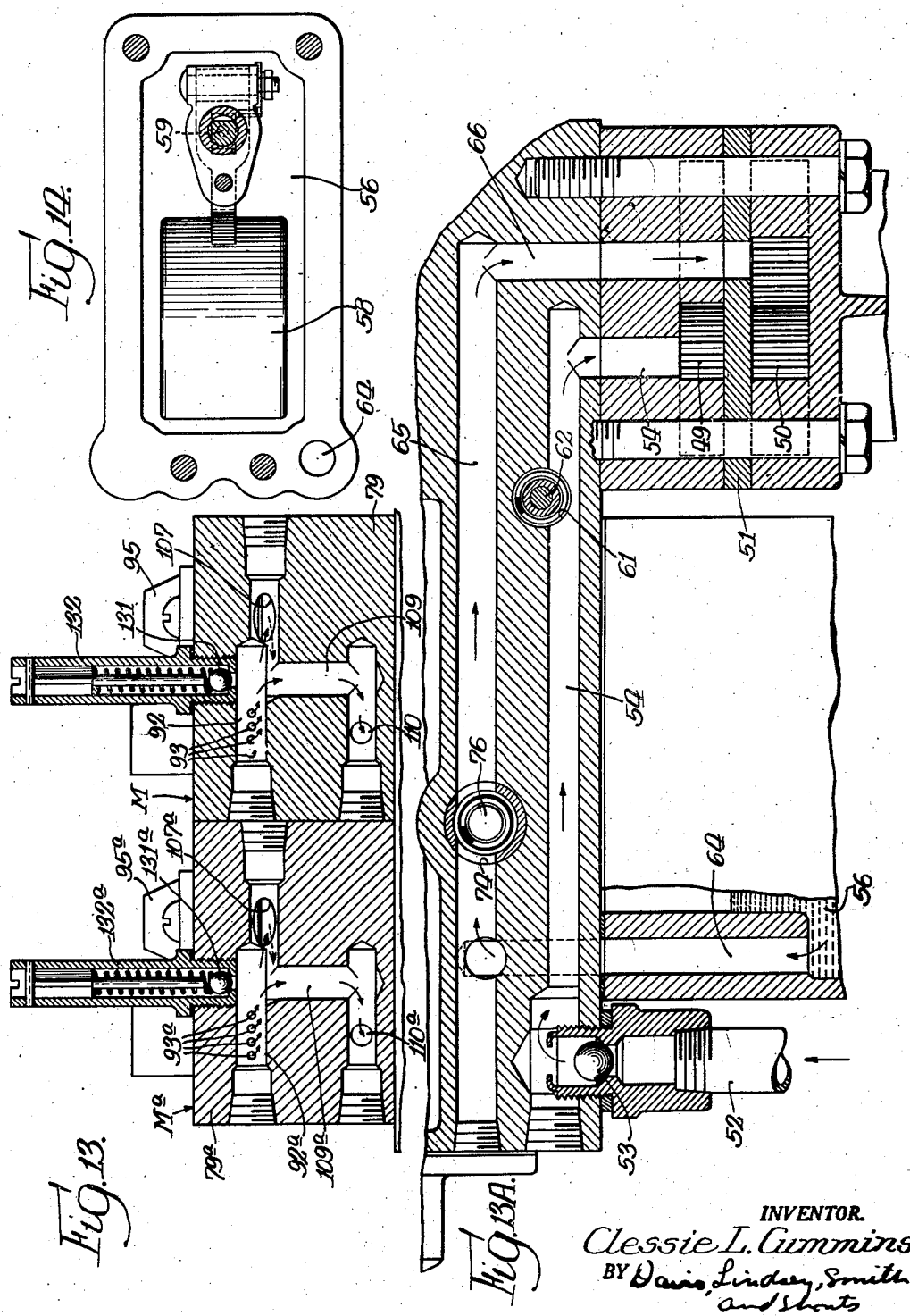

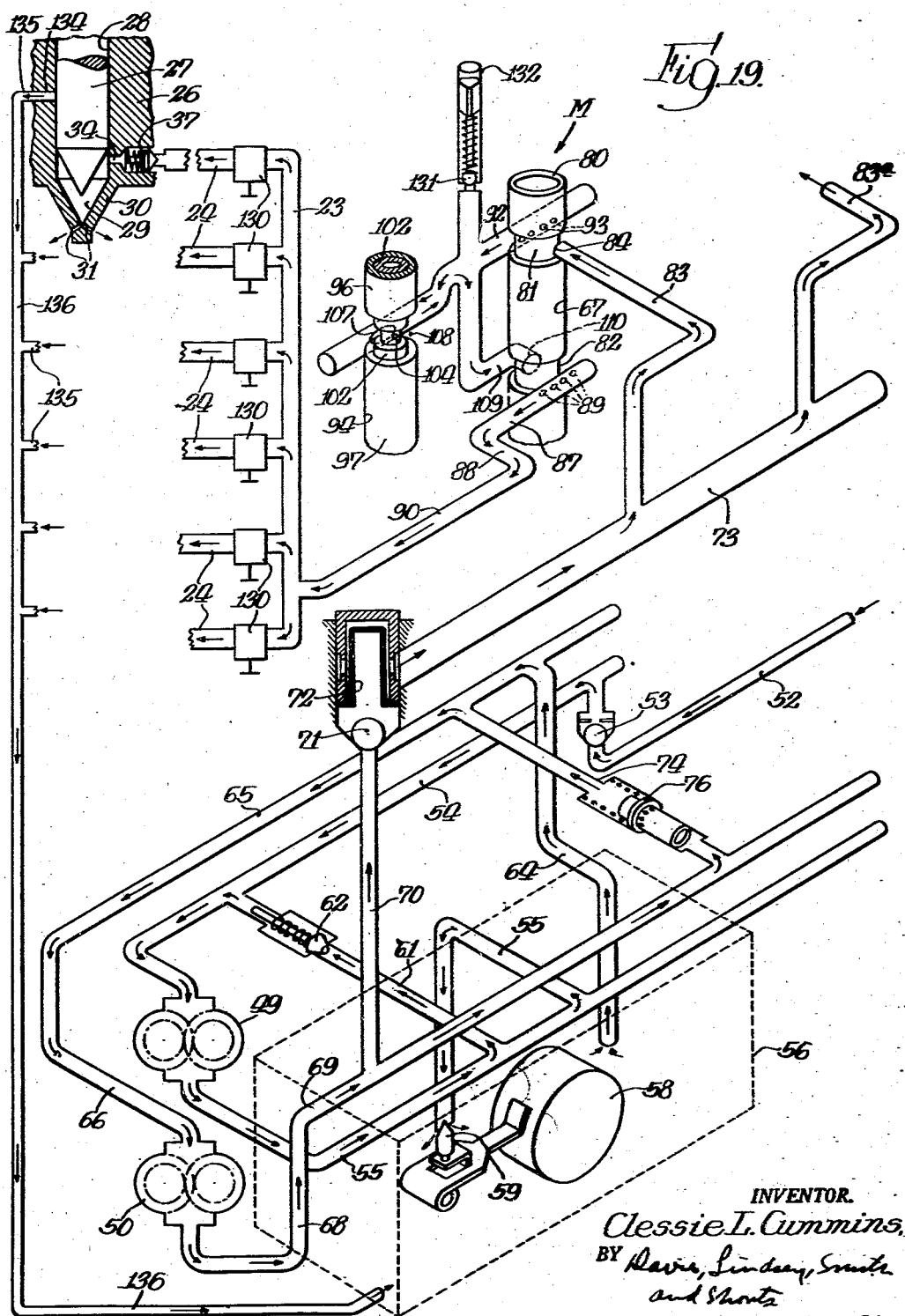

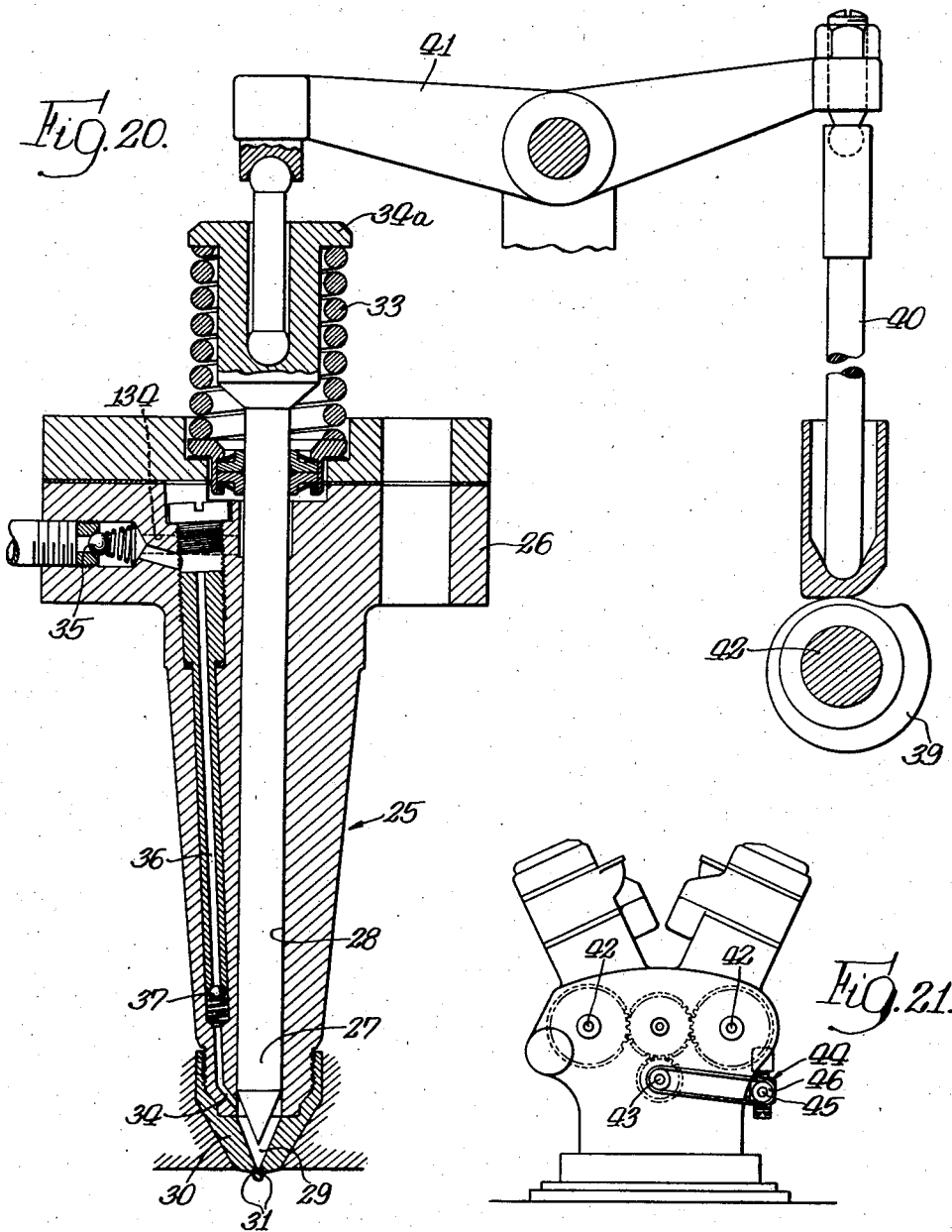

Patented Sept. 24, 1946

2,408,298

UNITED STATES PATENT OFFICE 2,408,298

FUEL FEEDING AND INJECTION APPARATUS FOR OIL-BURNING ENGINES

Clessie L. Cummins, Columbus, Ind., assignor to Cummins Engine Company, Inc., Columbus, Ind., a corporation of Indiana Application April 26, 1943, Serial No. 484,562

2 Claims. (Cl. 123—139)

The present invention relates to that type of fuel distributing and injection system which is characterized by the feeding of measured and equal charges of fuel at relatively low pressure to several injectors by a fuel measuring and delivery device, and the discharge of such charges by the injectors into the engine cylinders against the much higher compression pressures pertaining therein.

The principal object of my present invention is to provide an improved and simple fuel metering and delivery device in conjunction with the positive type of injectors, the metering and delivery device being common to all of the injectors, which of themselves act as positive valves in affording distribution of the fuel charges in proper sequence to the several injectors and which are actuated to discharge the respective charges from the injectors into the combustion chambers of the engine cylinders.

Another object of my invention is to provide a fuel feeding and injection apparatus in which each of the fuel injectors has a fuel charge space and an inlet port and a plunger for opening and closing the port and ejecting the fuel charge from the charge space into the combustion space in the respective engine cylinder, the plungers being operated in predetermined order so that but one port is opened at a time, and in which apparatus a single fuel metering and delivery device delivers fuel to a line common leading to said ports.

Another object of my invention is to provide a novel control device for alternately establishing and disestablishing communication between means for feeding the fuel to the metering and delivery device and also between the latter and the common line.

A further object of my invention is to provide a metering and delivery device so that it serves a plurality of injectors and is positive in action and simple in construction.

The above and further objects of my invention will be set forth in the following specification, reference being had to the accompanying drawings, and the novel means by which said objects are effectuated will be definitely pointed out in the claims.

In the drawings:

Figure 1 is a side elevation of my improved metering and pump apparatus, including the governor;

Fig. 2 is a rear or right hand end elevation of the apparatus shown in Fig. 1;

Fig. 3 is a vertical longitudinal section taken through the apparatus, along the line 3—3 of Fig. 2 and looking in the direction of the arrows;

Fig. 4 is a horizontal section taken on the line 4—4 of Fig. 3 and showing the gear pump for pumping fuel at low pressure from a supply tank into a float chamber;

Fig. 5 is a horizontal section taken on the line 5—5 of Fig. 3 and showing a gear pump for drawing fuel from the float chamber;

Fig. 6 is a horizontal section through the apparatus, the section being taken on the line 6—6 of Fig. 3 and with some of the parts broken away;

Figs. 7 and 8 are horizontal sections through the lower part of the apparatus, the sections being taken on the lines 7—7 and 8—8, respectively, of Fig. 2;

Fig. 9 is a vertical section taken on the line 9—9 of Fig. 1;

Fig. 10 is a fragmentary horizontal section taken on the line 10—10 of Fig. 9;

Fig. 11 is a vertical longitudinal section through the right hand side of the apparatus, the section being taken on the line 11—11 of Fig. 2;

Fig. 12 is a fragmentary vertical section taken on the line 12—12 of Fig. 11;

Fig. 13 is another vertical section taken longitudinally through the apparatus on the line 13—13 of Fig. 2;

Fig. 13A is another vertical section on the line 13A—13A of Fig. 2;

Fig. 14 is a top plan view of the float chamber and float, with the float valve shown in section;

Figs. 15 and 16 are horizontal longitudinal sections through the metering and fuel charge device, the sections being taken, respectively, on lines 15—15 and 16—16 of Fig. 1;

Fig. 17 is a vertical section, taken on the line 17—17 of Fig. 16;

Fig. 18 is a vertical section taken on the line 18—18 of Fig. 16;

Fig. 19 is a schematic view of my improved fuel feeding and distributing system, with one of the fuel injectors shown diagrammatically.

Fig. 20 is a view showing one of the injectors in vertical section, the cam shaft for operating the injectors and the operating connections from one of the cams to the plunger of the injector illustrated, and Fig. 21 is a somewhat diagrammatic front view of a 12-cylinder engine.

Referring first to Fig. 19, I have, by way of example only, schematically illustrated therein my invention adapted for use in a six-cylinder four-cycle engine of the Cummins-Diesel type, though in other figures, I have shown the metering and pump apparatus as adapted for use on a twelve cylinder engine, as will be pointed out more fully later. In Figure 20 I have illustrated one of the injectors, which is designated generally by the numeral 25, the injector being also illustrated and more fully described in my U. S. Letters Patent No. 2,190,015, granted February 13, 1940. In Figure 19 I have shown the lower portion of one of the injectors somewhat diagrammatically, and the injectors as being supplied with charges of fuel oil from a common line 23 through pipes 24, one for each injector. The term "fuel oil" may be considered as embracing any suitable liquid fuel.

Each injector has a body 26 suitably mounted in the cylinder head of the engine. An injection plunger 27 is reciprocably mounted in the central bore 28 in the body. The plunger is provided with a conical end adapted to be periodically moved into a correspondingly shaped mixing chamber 29 formed in a cup-shaped member 30 which is mounted on the lower end of the body and which has one or more ejection ports 31 connecting the chamber 29 with the combustion space of the cylinder. A spring 33, compressed between the top of the body and a head 34a on the upper end of the plunger, is compressed and tends to raise the plunger to its upper position, when allowed to do so by a cam 39, as shown in Figs. 19 and 20, and in which position a fuel port 34 is uncovered by the cylindrical part of the plunger. A charge of liquid fuel is fed past a check valve 35, through a passage 36 in the body, past a second check valve 37 and through the port 34 into the chamber 29, when the plunger is elevated, that is, when the port is uncovered. During a portion of the suction stroke of the piston in the engine the charge of fuel under pressure is forced into the chamber 29 by means to be described presently. During the compression stroke of the piston, air is driven from the combustion space into the mixing chamber 29 through the ports 31 to mix and vaporize the oil. Shortly before the piston reaches top center on its compression stroke, the plunger is positively driven downwardly by the cam 39, through a pitman 40 and a rock lever 41, to inject the entire mixture of fuel and air from the chamber into the combustion space. At the beginning of the downstroke of the plunger, it covers the port 34. The cams 39, there being one for each injector, are mounted on the cam shaft 42 which is driven from the main crankshaft 43 (Fig. 21) through suitable connections (not shown) at one-half speed of the crankshaft. The cams are arranged on the cam shaft so that only one plunger 27 is fully raised and its port 34 uncovered at that time.

The fuel system includes a low pressure gear pump for pumping the fuel oil from the source of supply into a float chamber, a higher pressure gear pump for pumping oil from the float chamber into a metering and fuel delivery device which serves the injectors and forces a measured charge of fuel through the line 23 and the appropriate pipe 24 into the mixing chamber of the particular injector which has its port 34 uncovered by the plunger 27 at the time.

The entire fuel metering and feeding apparatus is mounted in the casing to provide a compact and light weight unitary assembly, readily adapted to be mounted on the engine. The casing, which is designated generally by the numeral 44, has suitably journaled therein a cam shaft 45 (Fig. 3), on the forward end of which is keyed a sprocket 46 driven from and in phase with the crankshaft of the engine and at the same speed as the crankshaft. Through two meshing bevel gears 47, the shaft 45 rotates a vertical shaft 48 which, in turn, operates a low pressure gear pump 49 (Figs. 3, 4 and 19) and a higher pressure gear pump 50, (Figs. 3, 5 and 19). One gear of each pump is mounted on the shaft 48, and the pumps are separated by a plate 51.

As best shown in Fig. 19, the gear pump 49 serves to pump the fuel from a supply tank (not shown), through a pipe 52, past a check valve 53, through a passage 54 to the pump, and then to discharge the fuel through a passage 55 into a float chamber 56. It will be observed that these passages (and other passages and ports to be mentioned) are shown in Figs. 3, 8, 11 and 13 and other as being drilled or otherwise formed in the walls of the casing itself, thus conserving space and eliminating the danger of breakage and leakage.

Mounted in the float chamber 56 (Figs. 3, 8, 14 and 19) is a float 58 controlling a valve 59, in the usual way, to maintain a predetermined level of fuel in the chamber. Between the passages 54 and 55 is a connecting by-pass passage 61, as best shown in Figs. 8, 9 and 19, in which is mounted a pressure control valve 62. When the valve 59 in the float chamber is closed, the fuel pumped by the pump 49 is circulated through this by-pass 61, until the fuel level in the float chamber is lowered, permitting the valve 59 to open and more fuel to be admitted into the float chamber. At higher engine loads the valve 59 remains open because of the greater fuel consumption.

The higher pressure gear pump 50 draws the fuel from the float chamber through passages 64, 65 and 66 (Figs. 7, 13 and 19) and discharges the oil through passages 68, 69 and 70, past a check valve 71 and through a strainer 72 into an enlarged passage 73 (Figs. 9, 10, 11 and 19). From a passage 73, which acts as the surge chamber to be described later, the oil is fed to the device which meters and delivers a measured charge of oil through the line 23 (Fig. 19) into the mixing chamber of the particular injector having its port 34 uncovered. A cross passage 74 connects the passage 65 with the passage 69 beyond the passage 70 and within the passage 74 is a pressure control valve 76 as best shown in Figs. 12 and 19. This passage with its valve provides a by-pass for the fuel back to the pump 50 at "no load" condition of the engine.

In the drawings, I have illustrated an apparatus adapted for use on a 12-cylinder engine, there being two identical metering and delivery devices, one for each bank or group of six cylinders. The two devices being identical, I will describe one and apply the same reference numerals to the corresponding parts of the other with the suffix a added. The one device is designated generally by the letter M and the other by the letter M$^a$ in Figs. 1, 3, 11, 13, 15 and 16, and the device M is schematically shown in Fig. 19. Reference will also be made to some details in Figs. 17 and 18. The two devices are mounted in solid metal blocks 79 and 79$^a$ forming part of the casing, the blocks being drilled to provide bores for the moving parts and also to form certain passages.

Slidably mounted in a vertical bore 67 (Figs. 3 and 18 in particular) in the block 79 is a hollow slide valve 80 having two exterior annular grooves 81 and 82. As best illustrated in Figs. 15, 17, 18 and 19, a passage 83 extends from the surge chamber 73 and terminates in the bore in which the valve 80 is mounted. The end of the passage 83 forms a port, designated by the reference numeral 84, which when the valve is in the position illustrated in the figures just mentioned, opens into the upper groove 81. A cam follower 91 (Figs. 3 and 18) in the lower end of the slide valve rests on a cam 85 fast on the cam shaft 45. A spring 86 is compressed between the upper end of the valve and a cross bar 86'. Passages 87 and 88 (Figs. 16 and 19) are formed in the lower end of the block 79 and a plurality of ports 89 extend from the passage 87 and open into the bore 67 in which the slide valve is mounted. A pipe 90 is connected to the outer end of the passage 88 and its other end is connected to the common line 23 for the fuel injectors. The slide valve 80, as will be described presently, controls the passage of oil to a metering and delivery pump and also controls the passage of the fuel, delivered by this pump, through the pipe 90 to the common line 23 and the fuel injectors.

In the upper portions of the block M is a horizontal passage 92 (Figs. 15, 18 and 19) and a number of ports 93 connect one end of the passage with the bore 67 and the passage near its other end leads to and from the delivery pump. This pump will now be described, reference being made particularly to Figs. 3, 17 and 19. Fixedly secured in the upper end of another vertical bore 94 is the member 95 which is centrally bored and has a collar or sleeve portion 96 extending into the bore 94. A piston 97 in the form of a sleeve is mounted in the lower portion of the bore and has a cam follower 106 resting on a cam 99 fast on the shaft 45. A coil spring 100 is compressed between the lower side of the block 79 and a flange on the lower end of the sleeve piston 97.

Slidably mounted in the bore of the member 95 and extending into the bore of the piston 97 is a metering sleeve valve 102 which has an annular groove 103 and ports 104 connecting the groove with the central bore of the valve. A coiled spring 105 is compressed between a flange on the member 95 and a flange on the upper end of the valve 102, the spring tending to raise the valve, whose adjustment is controlled by a governor or by hand, as will be described presently.

The passage 92 intersects the bore 94 providing an oval shaped port 107 (Figs. 13, 17 and 19) opening into the fuel chamber 108 between the lower end of the fixed sleeve 96 and the upper end of the delivery plunger 97. Extending downwardly from the central portion of the passage 92 is an L-shaped passage 109 (Figs. 13, 15, 18 and 19) which has a port 110 opening into the annular groove 82 on the sleeve valve 80.

The governor for controlling the metering valve 102 is designated generally by the reference letter G (Figs. 1, 2, 3 and 6) and may be of any suitable design, the specific structure forming no part of my invention. As shown in Fig. 3 the main governor shaft 113 is driven from the cam shaft 45 through one of the beveled gears 47 and a beveled gear 114. The governor weight-levers 115 control the movement of a sleeve 116 and an arm 117, in contact with a thrust bearing on the sleeve, moves a shaft 118 which is connected by a link 119 (Figs. 1, 2 and 6) to an arm 120 fast on a short shaft 121 journaled in one of the side walls of the casing. A tension spring 127 (Fig. 1) tends to rotate the shaft 118 clockwise.

Journaled in the other side wall and in axial alignment with the shaft 121 is a shaft 1211 (Figs. 1 and 6) having its inner end reduced and supported in a recess of the adjacent end of the shaft 121. The shaft 1211 has an eccentric portion 1212 (Figs. 3 and 6) upon which is mounted a rocker lever 122, one end of which engages the upper end of the metering valve 102. The inner end of the shaft 121 carries a projection or tang 1213 which extends under and engages the other arm of the rocker lever 122. Mounted on the end of the shaft 1211, which projects out of the casing, is an arm 125 and another arm 125ᵃ is mounted on the projecting end of the shaft 121¹ᵃ (Figs. 1, 2 and 6). The arms 125 and 125ᵃ are connected by a link 1261. Mounted on the outer end of the shaft 121ᵃ is an arm 1200ᵃ and arms 120 and 1200ᵃ are connected by a link 126. The arm 125ᵃ has an upwardly projecting extension which is connected to the hand throttle control through suitable connections including a link or rod 1251 (Fig. 1). Through the mechanisms described the governor and hand throttle control effect adjustment of both metering valves 102 and 102ᵃ at the same time and to the same extent.

The speed of the engine, and also of the governor, increases as the engine load decreases. At such times, the governor-controlled shaft 121 rotates counterclockwise (Fig. 3) and with the hand-controlled shaft 1211 and its eccentric 1212 stationary, the tang 1213 tends to move away from one end of the rock lever 122, but the spring 105 raises its metering valve 102 progressively and maintains the contact between the lever and the tang. As the engine load increases the tang 1213 rocks the lever 122 clockwise and lowers the valve 102, the spring 127 then overcoming the spring 105 as the speed of the governor decreases.

It will also be apparent that as the hand control, such as a foot throttle, is operated, the shaft 1211 and its eccentric 1212 is adjustably rotated clockwise as the foot pedal is moved toward full throttle position and counterclockwise upon reverse movement of the foot pedal. During this adjustment of the eccentric, the tang 1213 serves as a fulcrum for one end of the rock lever 122, the other end, and hence the metering valve 102, being lowered when the eccentric is turned clockwise, and being raised by the spring 105 when the eccentric is turned counterclockwise.

The operation of the structure embodying my invention as described above is as follows, reference being made more particularly to Figs. 3, 17, 18 and 19.

During operation of the engine, the low pressure gear pump 49 draws fuel from the source of supply and delivers it to the float chamber 56. The higher pressure gear pump 50 draws oil from the float chamber and discharges the oil through the passages 68, 69 and 70 into the enlarged passage or surge chamber 73. During the suction or downstroke of the delivery plunger 97 the ports 93 are uncovered by the sleeve control valve 80 and fuel is forced from the surge chamber 73, through the passage 83, around the groove 81 in the sleeve 80 and through the ports 93, passage 92 and port 107 into fuel space 108 of the delivery pump. During this time the annular groove 82 of the control valve 80 is out of registry with the ports 89 so that these ports are covered by the valve.

As already explained the adjustment of the metering valve 102 is controlled by the governor and by the hand-control throttle. In Figures 3 and 17 the valve 102 is shown in its lowermost or "full fuel" position and the delivery plunger 97 is shown in its lowermost position with its upper edge just above the upper edge of the groove 103 in the valve 102. In Fig. 19 the delivery plunger 97 is shown in its lowermost position while the metering valve 102 is shown raised to its uppermost or "no fuel" position. As the valve is adjusted between its "full fuel" and "no fuel" positions, more or less of its groove is in registry with the fuel space of the pump, or in other words, more or less of the groove 103 extends above the upper edge of the delivery plunger 97 when the latter is in its lowermost position. The fuel space fills up as the ports 104 in the valve 102 are smaller than the passages and ports through which the fuel is fed to the fuel space, and some of the oil so fed passes through the ports 104 to the central bore in the valve and then drops into the cam follower 106 and escapes through a hole in the follower back to the float chamber 56. Before the delivery plunger 97 begins to be raised by its cam 99, the cam 85 has raised the control valve 80 sufficiently to close the ports 93 and the ports 89 are then opened. The delivery plunger therefore forces some of the oil out of the fuel space 108 through the ports 104 in the metering valve 102 until the plunger covers the groove 103 in this valve. Thus a measured or metered charge of fuel is trapped in the fuel space, the size of the charge being determined by the operating conditions of the engine. It will be understood, of course, that when the metering valve 102 is in its full load position, as illustrated in Figs. 3 and 17, none of the fuel in the fuel space 108 escapes through the groove 103 and ports 104 because the delivery plunger completely covers the groove and delivers a full charge of fuel.

The cam 99 for the delivery plunger, the cam 85 for the control valve 80 and the cams 39 for the injecting plungers 27 of the fuel injectors are in such timed or phased relation to each other and the main crankshaft that when the delivery plunger 97 is raised the control valve 80 is also raised to cover the ports 93 and then uncover or open the ports 89 and only one of the injecting plungers 27 is fully elevated and the corresponding fuel inlet port 34 of the injector is opened, so that the measured quantity of oil in the fuel space 108 is forced through the port 107, the passage 109, the port 110 around the groove 82 of the control valve, through the ports 89, passages 87 and 88, and pipe 90 into the common line 23 from whence the metered charge of oil is discharged through the pipe 24 past the check valves in the injector and through the exposed port 34 into the mixing chamber 29 of the particular injector. Next the sliding valve 80 is lowered to close the ports 89 in order to prevent fuel from backing up into the delivery pump and then the injector plunger 27 is lowered and immediately covers the port 34 and then discharges the mixture of oil and air from the mixing chamber through the spray ports 31 into the combustion space of the cylinders. The cams 85 and 99 permit the springs 86 and 109 to lower the control valve 80 and delivery plunger 97, respectively, the fuel space 108 is again filled and the delivery plunger is raised again by the next lobe on its cam 99 to inject a charge of fuel into the mixing chamber of the injector for the cylinder next in the "firing" order of the engine and so on.

As already brought out, with the hand control eccentric 1212 (Figs. 3 and 6) in fixed position, if the engine speed is reduced the governor spring 127 overcomes the spring 105 of the metering valve 102 and lowers this valve toward "full fuel" position. This causes the engine to speed up, and then the governor weights 115 overcome spring 127, so that the valve 102 is permitted to be raised by its spring 105. This condition continues until an equilibrium is reached between the parts and the engine speed is held constant. Under hand throttle conditions, the eccentric 1212 is not fixed, so that even when the governor, upon reducing engine speed, calls for more fuel by rotating the rock lever 122 clockwise (Fig. 3), the hand control eccentric may be turned counterclockwise to lift the right hand end of the lever and permit the spring to raise the valve 102, even though the fulcrum point (that is the tang 1213) has changed. The hand control eccentric is such that it may raise the valve to its "no fuel" position even when the governor calls for full fuel, and in this manner the engine may be brought to rest. The linkage is so set that it is impossible to force the control valve down further than a predetermined point, which limits the load carrying ability of the engine and prevents overloading.

It will be observed that the cam shaft 42 carrying the cams 39 for operating the six injector plungers 27 is rotated at one-half crankshaft speed (through suitable gearing which is not shown) and that the shaft 45, carrying the three-lobe cam 99 for the delivery pump and the three-lobe cam 85 for the control valve 80 is rotated at crankshaft speed so that three of the injector plungers are operated during each rotation of the crankshaft and the metering and pumping device is likewise operated three times during each revolution of the crankshaft.

It will be observed that the control valve 80 and metering valve 102 "float," that is to say, their free operation is not affected or impaired in any way by oil pressure, as there is no oil pressure on either end of either valve and there is no side pressure against either valve, such as would press or bias the valve against the bore in which it operates. The passage 73 is enlarged to act as a surge chamber to minimize or eliminate objectionable vibration which would otherwise result due to the fact that the fuel is intermittently fed past the control valve to the delivery pump and the cut on and off at the ports 93 tend to cause pulsations in the line leading to the control valve.

In each branch 24 (Fig. 19) from the common line 23 to the injectors is a manual shut-off valve 130. In the event one of the injectors has wholly or partially failed, the valves may be individually turned off and on during operation of the engine, and it can thus be determined which of the injectors has failed by the action of the engine when each valve is closed.

If an injector fails or in case one of the valves 130 is closed, the oil pumped by the delivery pump would create too great a pressure between this pump and the injector or closed valve 130, and I therefore provide a relief ball valve 131 (Figs. 13 and 19) connected into the passage 92, oil equal to the amount pumped by the delivery pump being forced past the spring pressed ball and dumped out of the upper open end of the valve casing 132 under the conditions stated.

Any oil leaking up between the injector plungers 27 and the bores 28 of the injector bodies escapes through ports 134 (Figs. 19 and 20) in the bodies and passes through pipes 135 to a common line 136 leading back to the float chamber 56.

In a 12-cylinder engine, the other metering and delivery unit M$^a$ operates in the same manner to deliver metered charges of fuel to the mixing chambers of the injectors for the other bank or group of six cylinders. The cams 85, 85ª, 99, 99ª and the cams 39 for operating the plungers 27 of the injectors are in such timed relation that the two metering and delivery devices are alternately operated and the injectors for the two groups of cylinders are also operated alternately.

I claim:

1. In a multi-cylinder, oil burning engine, a plurality of injectors, one for each cylinder and each comprising a body having a fuel inlet port and a reciprocable plunger therein adapted when moved in one direction to leave a chamber in said body communicating with the associated cylinder and to open the inlet port, said chamber being adapted for mixing fuel and air, means for operating said injector plungers in predetermined order so that but one inlet port is opened at a time, a fuel line common to all of said ports, a fuel pump for delivering a controlled quantity of fuel to said line each time an inlet port is open and thereby forcing a like quantity of fuel from said line through said port to the associated chamber, said fuel pump acting to so deliver fuel to each chamber in timed relation to movement of the piston in the associated cylinder that the piston thereafter forces air into the chamber to mix with the fuel therein, the plunger being timed to move thereafter in the opposite direction to close the port and to discharge the mixture of fuel and air from the chamber into the cylinder.

2. In a multi-cylinder, oil burning engine, a plurality of injectors, one for each cylinder and each comprising a body having a fuel inlet port and a reciprocable plunger therein adapted when moved in one direction to leave a chamber in said body communicating with the associated cylinder and to open the inlet port, said chamber being adapted for mixing fuel and air, means for operating said injector plungers in predetermined order so that but one inlet port is opened at a time, a fuel line common to all of said ports, a fuel pump, a single valve between said fuel line and fuel pump, said fuel pump delivering a controlled quantity of fuel through said valve to said line each time an inlet port is open and thereby forcing a like quantity of fuel from said line through said port to the associated chamber, said fuel pump acting to so deliver fuel to each chamber in timed relation to movement of the piston in the associated cylinder that the piston thereafter forces air into the chamber to mix with the fuel therein, the plunger being timed to move thereafter in the opposite direction to close the port and to discharge the mixture of fuel and air from the chamber into the cylinder.

CLESSIE L. CUMMINS.